United States Patent [19]

Rausch

[11] Patent Number: 5,081,384
[45] Date of Patent: Jan. 14, 1992

[54] COOLED ELECTRIC MOTOR PROTECTING COMPONENTS FROM COOLANT

[75] Inventor: Hartmuth Rausch, Korschenbroich, Fed. Rep. of Germany

[73] Assignee: Schorch GmbH, Munchen Gladbach, Fed. Rep. of Germany

[21] Appl. No.: 420,350

[22] Filed: Oct. 12, 1989

[51] Int. Cl.⁵ .................... H02K 9/18; H02K 5/10
[52] U.S. Cl. .................................. 310/63; 310/57
[58] Field of Search ............... 310/62, 63, 64, 89, 310/88, 57, 90

[56] References Cited

U.S. PATENT DOCUMENTS

| | | | |
|---|---|---|---|
| 2,592,070 | 4/1952 | Robinson | 310/89 |
| 2,650,316 | 8/1953 | Johns et al. | 310/63 |
| 3,445,698 | 5/1969 | Miko | 310/89 |
| 3,610,975 | 10/1971 | Onjanow | 310/63 |
| 4,406,959 | 9/1983 | Harano et al. | 310/89 |
| 4,742,257 | 5/1988 | Carpenter | 310/57 |
| 4,745,314 | 5/1988 | Nakano | 310/57 |

Primary Examiner—Steven L. Stephan
Assistant Examiner—D. L. Rebsch
Attorney, Agent, or Firm—Michael J. Striker

[57] ABSTRACT

A cooled electric motor comprising a releasable sealing cover element for protecting electrical components, in particular, coil winding heads located in end spaces between opposite end faces of a stator plate pack and respective bearing shields. The cover can be removed for service in cleaner environments.

8 Claims, 3 Drawing Sheets

COOLED ELECTRIC MOTOR PROTECTING COMPONENTS FROM COOLANT

BACKGROUND OF THE INVENTION

The invention relates to an air cooled electric motor having a stator, a rotor, end plates and a fan, for higher protection systems than IP 23.

Standard electric motors for individual protection systems, for example, IP 23 or IP 54 (DIN 40050) are very different in construction. This means that special components must be produced and stored for each motor construction. The reason for the different constructions is the various regulations which must be observed concerning the movement of the cooling air, in dependence on the protection system. The electric motor is used in the higher protection systems where components of a machine must be so protected against foreign bodies or the ingress of water that it results in not enough cooling air being supplied to the winding heads of the coils in the stator. Frequently the construction having cooling fins on the external periphery is selected for these higher protection systems. A fan attached to an end face of the motor supplies cooling air in the axial direction through the channels which are formed between the fins and are open at the top, although the cooling result at the start and end of the motor differs greatly. Due to the cooling channels open at the top, the cooling air passes over and cools the casing jacket only over a portion of its length, while the cooling air increasingly escapes upwards out of the channels in the axial direction of the casing, so that the end of the motor casing is inadequately cooled. With the lower protection systems, the fan attached to an end face of the motor sucks or forces surrounding air through openings in the end plate disposed at the axial end of the motor remote from the fan and forces such air in the axial direction through the free spaces in the motor. Examples of the different construction of conventional standard motors are shown in FIGS. 1 and 2. FIG. 1 illustrates an electric motor of low protection system, for example, IP 23, while FIG. 2 shows a standard motor of higher protection system, for example, IP 54. As can be readily seen, in the two kinds of standard motor the casings are very differently constructed.

SUMMARY OF THE INVENTION

It is an object of the invention to provide casings of identical construction and means which make possible intensive cooling for higher protection systems, in the interests of standardizing electric motors for low and also higher protective systems.

The object of the invention is achieved by providing electric motors which are characterized by having a releasable cover to protect the coil winding heads in the end spaces of the motor between the end face of the stator plate pack and the end plate, the cover hermetically separating the spaces containing the electrical elements from the spaces cooled by the flowing cooling medium.

Preferably the cover takes the form of a dish, a ring, or an annular disc and can have cooling fins.

The stator plate pack can also be radially enlarged and be formed with a number of continuous axial bores.

Furthermore the motor can be built without a casing in such a way that two pot-like bearing shields are directly secured each of them to oppossed ends as is, i.e. known from DE-AS 538 900.

The Swiss Patent 406,396 discloses that the pot-like bearing shields can be clamped to the stator plate pack by threaded bolts inserted through certain of the axial bores in the stator plate pack. However, the parts can also be welded to the stator plate pack.

The radial enlargement of the stator plate pack, which was known per se, for example, from DE-AS 873 718, allows the accommodation of axial cooling channels which create satisfactory cooling conditions over the whole length of the motor.

By abolishing the casing, the possibility of identical forming of the two bearing shields for both sides of the machine results in reducing the diversity of parts.

According to the invention, for higher protection systems than IP 23, an additional releasable cover is provided in the form of a dish, a ring or an annular disc to protect the electrical elements, more particularly the winding heads of the coils in the stator, such cover being inserted in the end spaces of the motor between the end faces of the stator plate pack and the bearing shields and being sealed at the contact surfaces, in accordance with the particular requirements, against the entry of aggressive or wet atmosphere, foreign (dust) particles or water. The cover parts can then be identical for machines of different protection systems.

With a divided casing comprising the two bearing shields provided on both sides and also at the top with attachment surfaces for the connection box and the rating plate, the connection box and the rating plate can be disposed on any of the three sides dependent on accessibility.

The different length of the stator plate pack in electric motors of different protection system can be compensated either by an additional casing spacer ring, or a number of holes or slots for the attaching screws in the base of the casing.

Independently of its protection system, the construction of an electric motor according to the invention offers the following advantages:

the same electrically inactive parts can be used for motors of different protection systems. This standardization represents a considerable saving in manufacturing and warehousing costs;

the cooling of all motors is appreciably intensified, however they may be constructed so that not only the fan output, but also air noises can be reduced;

the heat transfer from the plate pack to the cooling air takes place directly and not, as hitherto, via the casing;

the noises caused by magnetic excitations are reduced by strengthening the yoke in the stator plate pack and cannot be radially propagated to freely oscillating parts of the casing (casing jacket, webs, cooling fins and others);

the absence of the jacket casing in the central portion of the motor saves weight, if the radial enlargement of the stator plate pack is compensated by an axial shortening of the pack due to the more intensive cooling.

The invention will be explained in greater detail with reference to specific embodiments of the electric motor according to the invention, with reference to the accompanying drawings.

DETAILED DESCRIPTION OF THE PREFERRED EMBODIMENTS

Figure 1:
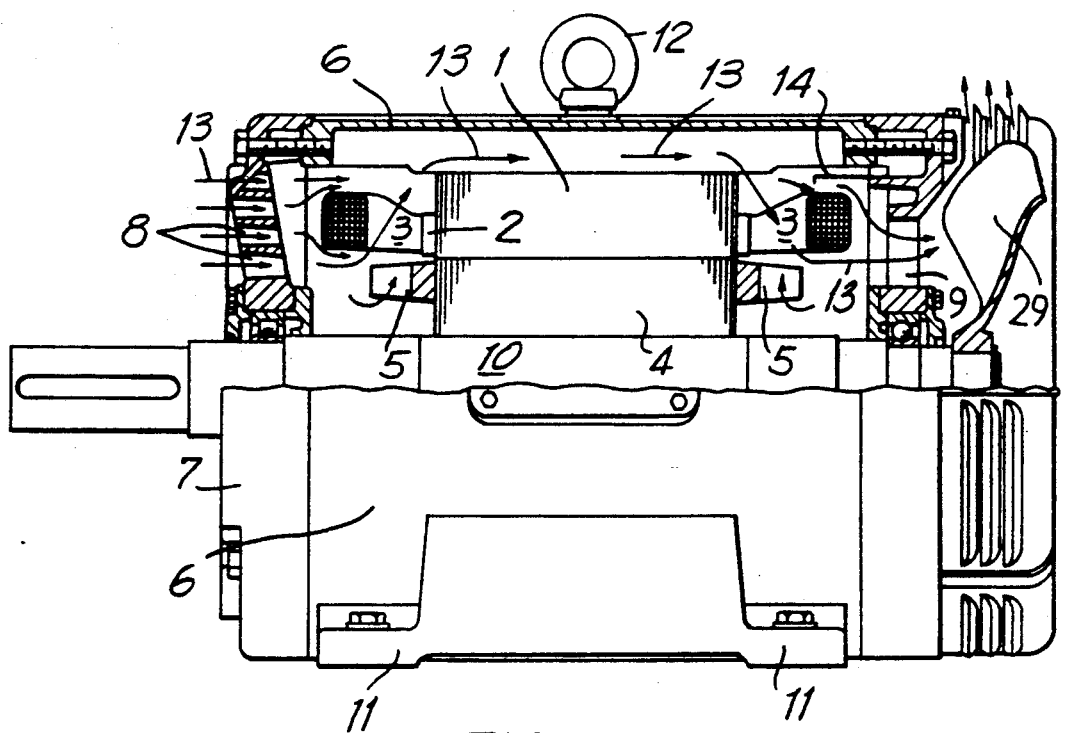
FIG. 1 shows a partially cross-sectional side elevaton view of; an electric motor constructed as an air-cooled rotary electric motor such as is selected, for example, for protection system IP 23.
Figure 2:
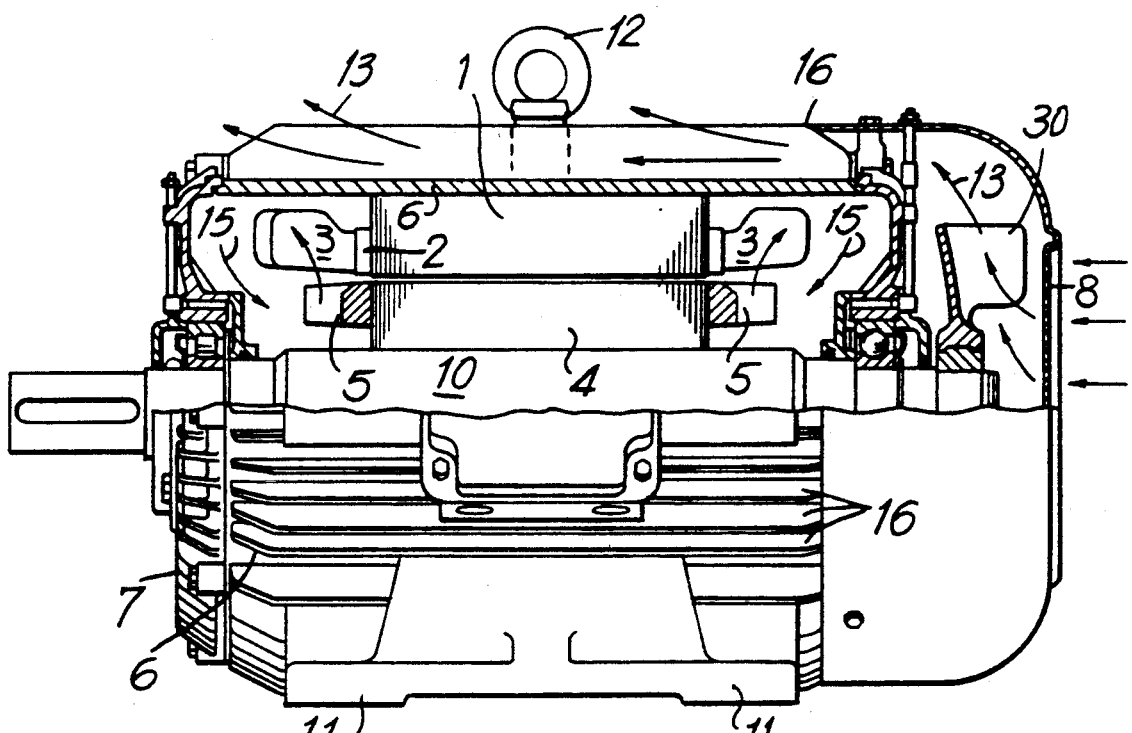
FIG. 2 shows a partially cross-sectional side elevation view of a conventional standard motor, for example, of protection system IP 44.

In the drawings like elements have like references.

Referring to FIG. 1, an air-cooled rotary electric motor, for example, of protection system IP 23, comprises a stator plate pack 1, coils 2 in the stator with the winding heads 3 projecting on both sides beyond the ends of the stator plate pack 1, and a rotor 4 which is disposed concentrically in the stator and has at its axial ends fan blades 5 for intensifying the cooling of the winding heads 3.

The stator and rotor are enclosed by a casing 6. Flanged on to the opposite axial ends of the casing 6 are bearing shields 7 formed with openings 8, 9 for entry and exit of cooling air into and out of the inside of the casing 6. The cooling air is sucked through the inside of the casing 6 by a suction fan 29 attached to the shaft 10 of the rotor 4 at one end of the casing 6. The path followed by the cooling air through the inside of the casing 6 is shown by arrows 13. Deflector plates 14 ensure that air flows around the winding heads 3.

Formed on the motor casing are feet 11 having holes, through which screws extend attaching the motor to the foundation, and an eyelet 12 for the insertion of a crane hook.

Figure 3:
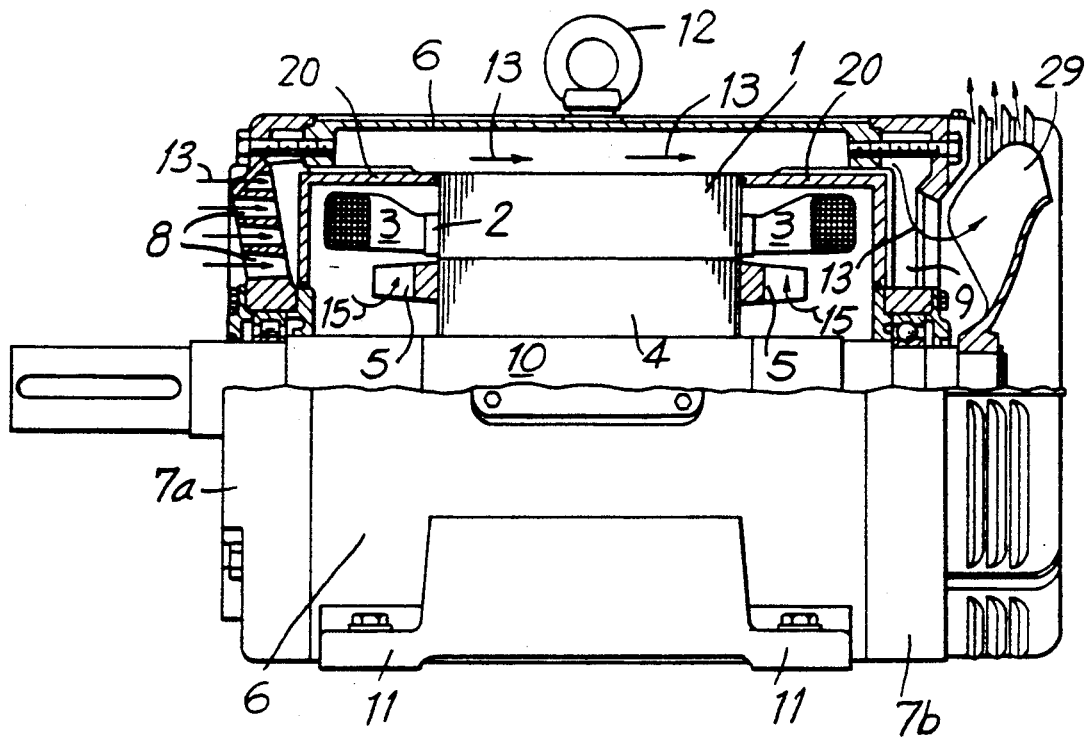
FIG. 3 shows a partially cross-sectional side elevation view of an electric motor constructed as an air-cooled rotary electric motor such as is selected for example, for protection system IP 23, with additional cap-like cover of the winding heads for protection systems higher than IP 23.

For a higher protection system than IP 23, the electrical components of the motor, more particularly the coil winding heads 3, are screened by a releasable cover. In the embodiment shown in FIG. 3, the releasable cover takes the form of a cap 20. The cap 20 extends between the bearing shied 7 and stator plate pack 1 in the two end spaces of the motor. The air circulation inside the space closed off from atmosphere via caps 20 is indicated by arrows 15. The cooling air moved by a suction fan 29 is sucked from atmosphere through the openings 8 into the motor and flows in the axial direction around the cap 20 through the annular duct formed between the stator plate pack 1 and the casing 6, in the direction indicated by arrows 13.

Figure 4:
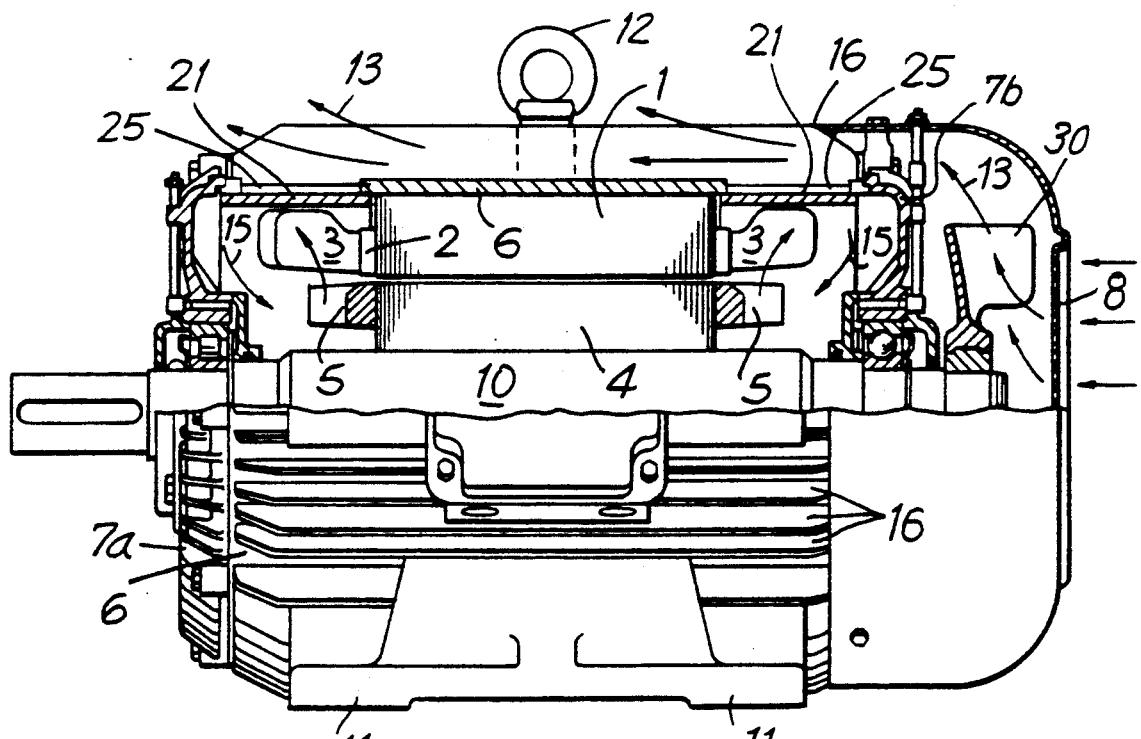
FIG. 4 shows a partially cross-sectoinal side elevation view of a conventional standard motor, for example, of protection system IP 44, the radial casing openings are closed for protecting the winding heads by ring covers.

With caps 20 covering the electrical components, the same motor can also be operated for higher protection systems than IP 23. In the embodiment illustrated in FIG. 4 the same motor can be used for higher protection systems than IP 23, merely by the insertion of a ring 21 which hermetically seals the radial openings 25 in the casing 6.

The bearing shields 7 are constructed as pot-like castings for greater standardization of components, the bearing shields on the drive side and on the fan side are of identical construction.

Figure 5:
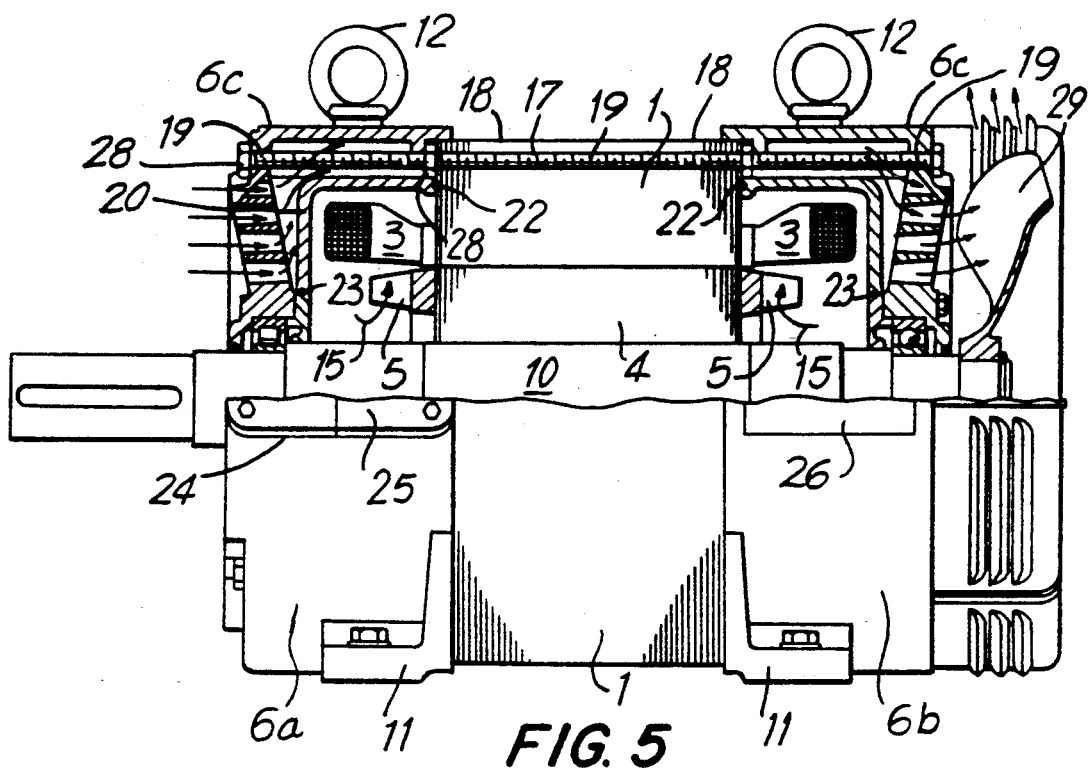
FIG. 5 shows a partially cross-sectional side elevation view of an electric motor according to the invention for low and higher protection systems, with suction ventilation and a dish-type cover of the winding heads.

In the embodiment illustrated in FIG. 5 the two winding heads 3, which project beyond the end faces of the stator plate pack 1, are again each covered by a cap 20 for electric motors of higher protection system than IP 23. Each cap 20 extends between the bearing shield 7 and the opposite end face of the stator plate pack 1, seals being inserted at both contact surfaces 22, 23.

Figure 6:
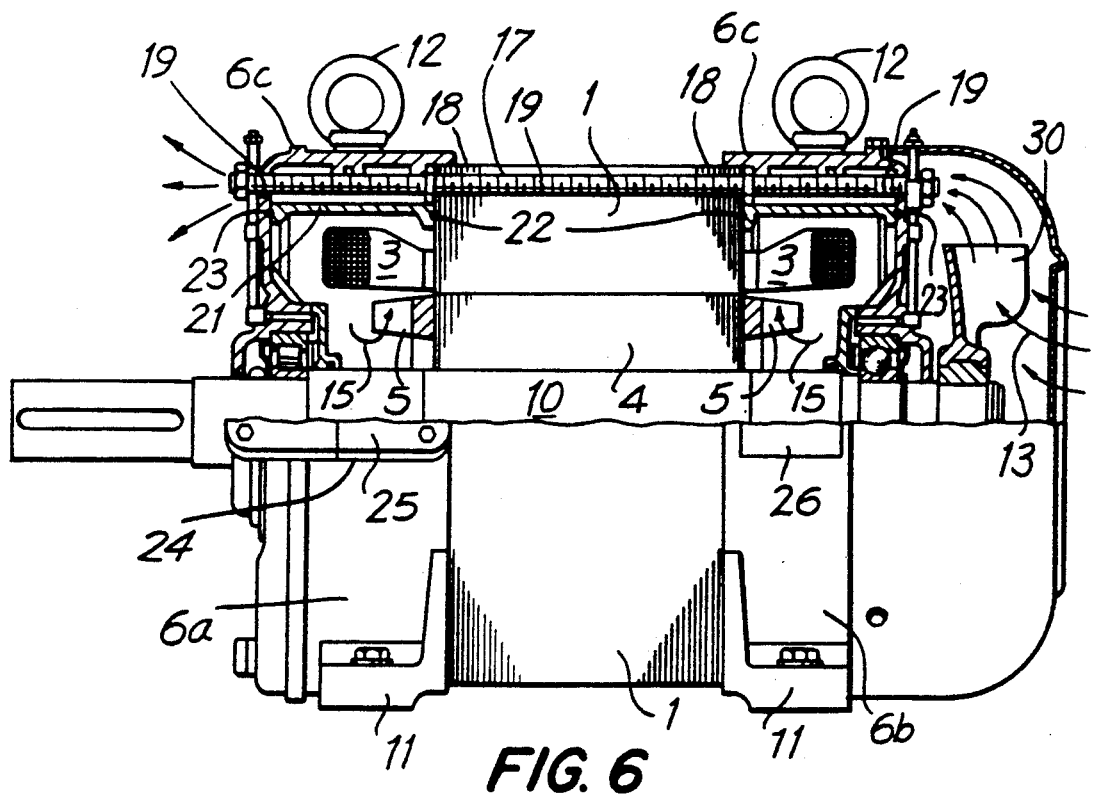
FIG. 6 shows a partially cross-sectional side elevation view of another embodiment of an electric motor according to the invention for low and higher protection system, with pressure ventilation and an annular cover for the winding heads.

Instead of the suction fan 29 (FIG. 5) a pressure fan 30 as shown in FIG. 6 can be used, in which the flow of cooling air 13 moves in the opposite direction. As shown in FIG. 6, the higher protection system than IP 23 is achieved according to the invention by the feature that the coil winding heads and electrical components between the bearing shield 7 and the stator plate pack 1 are covered by rings 21 which are again sealed against the outside cooling air by seals inserted at the contact surfaces 22, 23. The bearing shields 7 shown in FIG. 6 are formed with openings 8 for the entry and exit of the cooling air only in the outer edge zone.

On the bearing shields 7 attachment surfaces 24 are provided on three sides offset in relation to one another by 90°, two at the side and one at the top, for the attachment of a connection box or a rating plate.

While the invention has been illustrated and described as embodied in an electric motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cooled electric motor for higher protection systems than IP23, comprising a stator including a stator plate pack having opposite end faces; a rotor disposed in said stator; bearing shields arranged at opposite sides of said electric motor, defining, with said opposite end faces of said stator plate pack, end spaces, and having inlet and outlet openings for conducting cooling medium; electrical components located in said end spaces; and releasable cap-like sealing cover means hermetically separating said electrical components from the cooling medium in said end spaces.

2. A cooled electric motor as set forth in claim 1, wherein said electrical components comprise coil winding heads projecting beyond said opposite end faces of said stator plate pack, said electric motor further comprising fan means for cooling said winding heads.

3. A cooled electric motor as set forth in claim 2, wherein said releasable cap-like sealing cover means is formed with cooling fins.

4. A cooled electric motor as set forth in claim 2, wherein said stator plate pack is radially enlarged and has a plurality of continuous axial bores.

5. A cooled electric motor as set forth in claim 2, further comprising a casing including two members defining end plates and fitted onto peripheral locating surfaces at said opposite end faces and connected to said stator plate pack.

6. A cooled electric motor as set forth in claim 4, further comprising threaded bolts extending through at least several of said axial bores in said stator plate pack for attaching said bearing shield to each other and to said stator plate pack.

7. A cooled electric motor as set forth in claim 2, wherein said bearing shields have an identical construction.

8. A cooled electric motor as set forth in claim 2, wherein said electric motor further comprises a connection box and a rating plate, said bearing shields having attachment surfaces for securing thereto said connection box and said rating plate.

* * * * *